United States Patent [19]

Thayer

[11] E Patent Number: Re. 33,305

[45] Reissued Date of Patent: Aug. 21, 1990

[54] FIXTURE FOR SECURING AN ELECTRICAL CONNECTOR

[76] Inventor: C. Kenneth Thayer, 11141 Georgia Ave., Silver Spring, Md. 20902

[21] Appl. No.: 10,080

[22] Filed: Feb. 2, 1987

Related U.S. Patent Documents

Reissue of:

[64] Patent No.: 4,576,431
Issued: Mar. 18, 1986
Appl. No.: 729,402
Filed: May 1, 1985

[51] Int. Cl.[5] ..... G04D 7/00; H01R 13/74

[52] U.S. Cl. ..... 439/560; 33/563; 33/DIG. 10; 174/52.1; 220/3.6; 220/3.9; 220/241; 248/27.1; 248/300; 248/906

[58] Field of Search ..... 339/131; 33/563, DIG. 10; 174/52 R, 58, 66, 52.1; 220/3.6, 3.9, 241; 248/27.1, 300, DIG. 6; 52/221, 715; 439/560, 142

[56] References Cited

U.S. PATENT DOCUMENTS

| | | | |
|---|---|---|---|
| 312,943 | 2/1885 | Winans | 411/525 X |
| 945,753 | 1/1910 | Chamberlain et al. | 220/242 |
| 973,568 | 10/1910 | Russell | 439/560 X |
| 1,113,092 | 10/1914 | Bengler | 220/3.5 |
| 1,272,394 | 7/1918 | Devney | 248/221.4 X |
| 1,490,252 | 4/1924 | Bissell | 220/3.6 |
| 1,694,158 | 12/1928 | Both | 174/66 X |
| 1,734,322 | 11/1929 | Appleton | 220/3.4 X |
| 1,791,311 | 2/1931 | Hamblen | 220/3.6 |
| 1,963,951 | 6/1934 | Bowers | 220/3.92 |
| 1,975,690 | 10/1934 | Harrington et al. | 174/66 X |
| 2,047,298 | 7/1936 | Tinnerman | 411/527 |
| 2,439,090 | 4/1948 | Keating | 220/3.6 |
| 2,456,450 | 12/1948 | Sauter | 220/3.6 X |
| 2,457,119 | 12/1984 | Bour | 200/51 R |
| 2,772,062 | 11/1956 | Bowser | 220/3.6 X |
| 2,788,187 | 4/1957 | Cookson et al. | 248/300 X |
| 3,197,549 | 7/1965 | Good | 220/241 X |
| 3,380,612 | 4/1968 | Mossburg et al. | 220/3.6 |
| 3,476,634 | 11/1969 | Fleischmann | 52/715 X |
| 3,619,476 | 11/1971 | Rasmussen | 174/58 |
| 3,745,664 | 7/1973 | Altseimer | 220/3.4 X |
| 3,749,815 | 7/1973 | Boatwright et al. | 174/66 |
| 4,444,369 | 4/1984 | Job | 248/27.1 |

FOREIGN PATENT DOCUMENTS

| | | | |
|---|---|---|---|
| 188535 | 11/1906 | Fed. Rep. of Germany | 339/131 |
| 544080 | 3/1942 | United Kingdom | 339/131 |

*Primary Examiner*—Allan N. Shoap

[57] ABSTRACT

A fixture for securing an electrical connector, such as an outlet plate, includes a flat rectangular portion and elongated legs that can be fabricated during a single manufacturing step. The flat rectangular portion has a central opening with parallel sides at which the legs are bent. The legs of one side are staggered with respect to the legs of the other side. During installation the central rectangular opening is used as a template for marking where an opening is to be cut in a wall, and then the legs are inserted into the wall opening and bent outward to secure the opening to the wall. The connector element is then screwed to the flat rectangular portion of the fixture.

25 Claims, 2 Drawing Sheets

FIXTURE FOR SECURING AN ELECTRICAL CONNECTOR

Matter enclosed in heavy brackets [ ] appears in the original patent but forms no part of this reissue specification; matter printed in italics indicates the additions made by reissue.

The present invention is directed to a fixture for securing an electrical connector, and more particularly to a fixture which can be easily secured to a wall or other panel to permit an electrical connector such as an outlet plate (e.g., modular plug for a telephone, television antenna outlet, computer terminal connector, etc) to be mounted on the wall or panel.

Electrical wiring may be desirable in the walls of a home or other building for many purposes. For example, wiring may be used to carry electricity to power outlets mounted at convenient positions on a wall, or to carry television or telephone signals, or for other purposes. Such wiring typically terminates in an outlet plate which attractively mounts an appropriate electrical connector(s) to the wall, so that electrical equipment can be selectively connected to the wiring within the wall. Particularly in the case of powder outlets, fixtures known as "outlet boxes" are mounted within the wall to provide supports for the wall plates and to enclose the interior connections thereto.

Although various outlet box designs are known, a typical configuration might include an open-mouthed metal enclosure having four sides and a back, with flanges being provided at the opened mouth to accommodate screws for mounting the outlet plate and with openings being provided in the back to permit passage of wiring. This typical outlet box may be mounted by, for example, securing it to a structural member such as a 2×4 when the wall is installed.

The typical outlet box described above is relatively expensive to make and difficult to install, particularly if the wiring is being modified in an existing building. Although building codes in many areas provides specifications for the outlet boxes that must be used in particular applications, in situations where building codes and safety requirements permit it would be desirable to mount outlet plates to walls without the inconvenience and expense of outlet boxes.

SUMMARY OF THE INVENTION

Accordingly, an object of the present invention is to provide an inexpensively fabricated and easily installed fixture for mounting an electrical connector to a wall or panel.

Another object of the invention is to provide a fixture which can be easily mounted on walls or panels of different thicknesses.

Another object of the invention is to provide a fixture which facilitates wiring modifications in existing buildings.

Another object of the invention is to provide a fixture which can be fabricated in a minimum of manufacturing steps and which can be easily packaged for shipment.

These and other objects can be attained by providing a fixture having a flat portion and bendable legs extending from the flat portion. Holes in the flat portion accommodate screws for securing the outlet plate to the flat portion. During fabrication of the fixture, the legs and screw holes are imparted to a rectangle of metal in a single stamping operation. During installation of the fixture, the flat portion is used as a template for marking where a hole is to be cut in a wall and, after the hole is cut, the legs are inserted through the wall and bent to secure the fixture.

Although the fixture of the present invention is particularly adapted for use when existing buildings are rewired to provide outlet plates for telephones, televisions, computer terminals, etc., it is to be understood that the fixture may also be used in new construction. Moreover the fixture of the present invention is not limited to use in buildings, but may for example be adapted to secure an electrical connector to a panel in an equipment housing.

DESCRIPTION OF THE PREFERRED EMBODIMENTS

Figure 1:
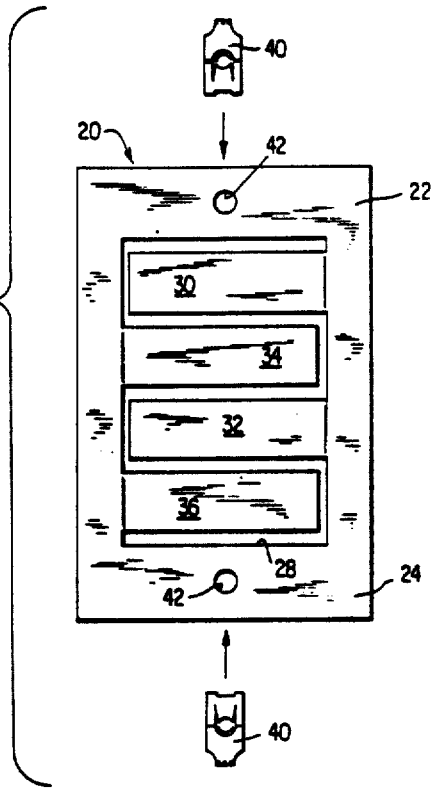
FIG. 1 is a front elevational view generally illustrating how a piece of sheet metal is fabricated to provide a fixture in accordance with the present invention.
Figure 3:
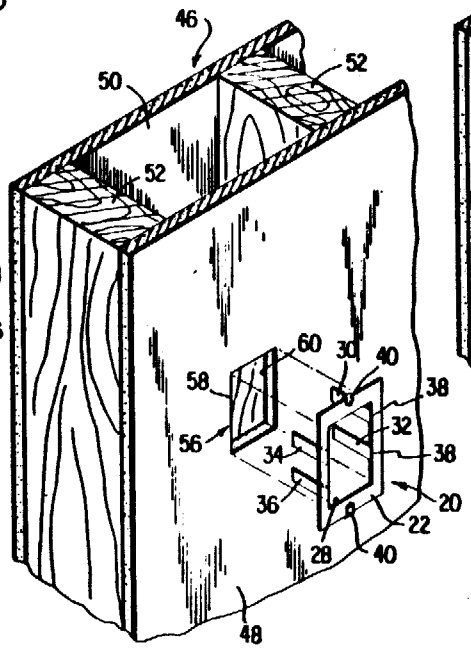
FIG. 3 is a perspective view illustrating insertion of the fixture into the wall of FIG. 2 after the hole has been cut.
Figure 2:
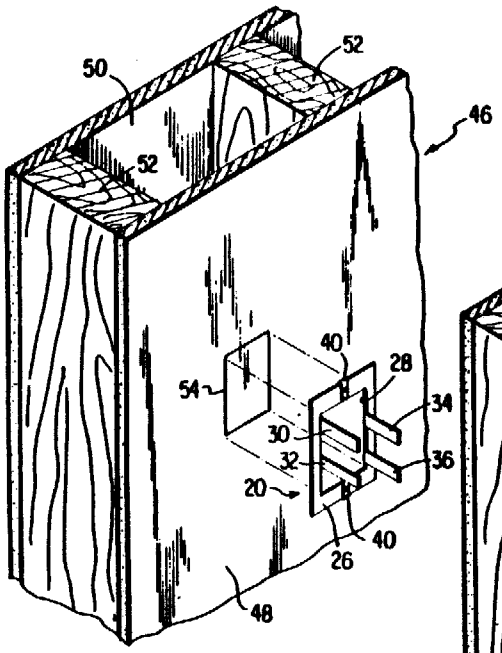
FIG. 2 is a perspective view illustrating the use of the fixture of the present invention as a template to mark where a hole is to be cut in a wall.

Referring first to FIG. 3, the fixture 20 of the present invention includes a rectangular flat portion 22 having a front side 24 and a rear side 26 (see FIG. 2). Portion 22 has a rectangular opening 28. Legs 30, 32, 34, and 36 join portion 22 at respective bent regions 38. Fastener clips 40 are snaped-fitted to portion 22 at screw holes 42 (see FIG. 1) therein. Clips 40 are known in the art and are used in lieu of nuts in order to engage screws. Eaton J-type fasteners, catalog number 11760-6/32, may be used for clips 40.

Turning next to FIG. 1, it will be apparent that portion 22, legs 30–36, and holes 42 can be made from a rectangular blank of sheet metal during a single press operation using an appropriately configured die. Although FIG. 1 illustrates legs 30–36 disposed in a plane, this is merely for purposes of illustrating what portions are removed from the rectangular blank. In practice the die is configured to produce the bent regions 38 in the same press operation that forms legs 30–36. In the preferred embodiment the blank is a 2 7/16 inches by 4 15/16 inches rectangle of 26 gauge (0.02 inches thick) galvanized steel. Legs 30–36, which are ½ inch wide and 1 11/16 inches long, are bent at 90°. Opening 28 is 2 11/16 inches by 1 13/16 inches. Such dimensions provide a fixture admirably suited for use with commercially available outlet plates that are typically used in homes or buildings but, as noted previously, the present invention is not restricted to such use.

A typical installation procedure will now be described with reference to FIGS. 2–4, which illustrate how an outlet plate 44 for providing a television signal may be mounted in a wall of a preexisting building. Wall 46 includes dry wall panels 48 and 50 which are nailed to 2×4s 52.

FIG. 2 illustrates the first step of the installation procedure. The installer inverts fixture 20 and places front side 24 thereof against panel 48 at the position where wall plate 44 is to be installed. Using fixture 20 as a template, the installer makes a mark 54 guided by rectangular opening 28.

Turning next to FIG. 3, the installer then cuts an opening 56 by sawing along the path indicated by mark 54. Legs 30–36 are then inserted into opening 56, which has an outer periphery 58 and an inner periphery 60. The distance between peripheries 58 and 60 may vary depending upon the thickness of the particular dry wall panel 48. Half inch thicknesses are common but not universal.

Figure 4:
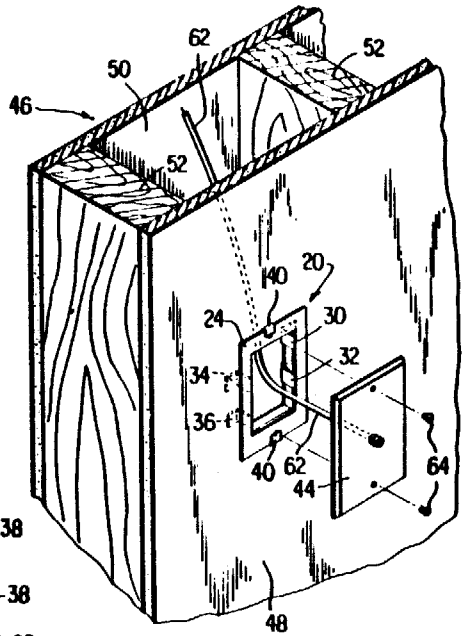
FIG. 4 is a perspective view illustrating an installed fixture, with its legs bent to secure it to the wall.

Turning next to FIG. 4, the installer then reaches into wall 46 through opening 58 and, using the edge provided by inner periphery 60 as a pivot point, bends legs 30–36 outward within wall 46. For maximum strength this bend is preferably 90°, and the bent-over portions (not numbered) of legs 30–36 are positioned flush against the back of panel 48. That is to say, the installer bends each of legs 30–36 into an L-shaped configuration, with the position of the intersection between the legs of the L being determined by the position of inner periphery 60.

With continuing reference to FIG. 4, the installer then wires the outlet plate in the conventional manner. In this example outlet plate 44 provides a standard 75 ohm connector for a television signal. 75 ohm coaxial cable 62 is run within wall 46 to connect outlet plate 44 to a television antenna (not illustrated) mounted on the roof of the structure. Thereafter the installer loops the slight excess of cable 42 into the wall and inserts sheet metal screws 64 through openings (not numbered) in outlet plate 44 and tightens the screws in fastener clips 40. This completes the installation procedure.

With reference next to FIGS. 1 and 3, it will be noted that legs 30 and 32 on one side of fixture 20 are displaced from legs 34 and 36 on the other side. This staggered arrangement facilitates packing the fixture 20 for shipment to distributors, and permits a relatively compact box to be used for this purpose. Assume, for example, that the fixtures 20 are to be shipped in lots of 25. A first stack of 12 fixtures 20 is assemblied, the legs 30–36 of each fixture in the stack extending through the openings 28 of fixtures higher in the stack. A second stack of 13 fixtures 20 is then assemblied in the same manner, and then the stacks are combined so that the rear sides 26 of the fixtures in one stack face the rear sides 26 of the fixtures in the other stack. Due to the staggering of the legs, the legs of one stack are interleaved with the legs of the other. For example, the legs 34 of one stack fit between the legs 30 and 32 of the other stack, etc. The net result is a compact and essentially rectangular assembly which is easy to package since the legs do not create irregularities in the profile of the 25 assemblied fixtures 20.

Figure 5:
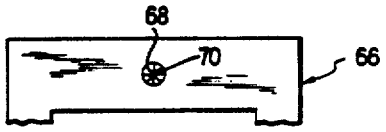
FIG. 5 is a front elevational view of a portion of a second embodiment of the fixture, and generally illustrates a screw hole, in the form of a dimple which barely breaks through, for mounting an outlet plate.

Fixture 20 may be modified in various ways. For example, it will be apparent that a "two-gang" fixture could easily be provided in order to mount a pair of outlet plates side-by-side. Another modification is illustrated in FIG. 5, which shows a portion of a fixture 66 which does not need fastener clips 40 in order to secure the sheet metal screws 64 which mount the outlet plate. Instead of holes 42 and clips 40 as in fixture 20, fixture 66 is provided with dimples 68 which barely break through to provide a central opening 70. During installation the sheet metal screw engages the opening 70 and, as the screw is rotated, the threads thereof engage and expand opening 70.

Figure 6:
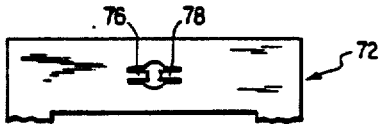
FIG. 6 is a front elevational view of a portion of another embodiment of the fixture of the present invention, and generally illustrates a screw hole, in the form of an irregular opening which provides legs to threadingly engage a screw, for mounting an outlet plate.

Another modification is illustrated in FIG. 6, wherein fixture 72 is provided with irregular H-shaped openings 74 which are configured to provide screw engagement legs 76 and 78. Legs 76 and 78 terminate in circular faces which have slightly different radii to securely engage a sheet metal screw, in the manner of a clip 40. Legs 76 and 78 do not lie in a plane, but are instead bent slightly outward.

It will be understood that the above description of the present invention is susceptible to various modifications, changes and adaptations, and the same are intended to be comprehended within the meaning and range of equivalents of the appended claims.

What I claim is:

1. A fixture for mounting an electrical connector element in an opening in a panel, the connector element having a plurality of openings to accommodate mounting screws, comprising:

a sheet metal element having a substantially flat portion with an opening therein, said opening having first and second spaced-apart ends and first and second spaced-apart sides that are substantially parallel, *said first and second sides being longer than said first and second ends, said substantially flat portion having a hole adjacent said first end of said opening and substantially equally distant from said first and second sides, said substantially flat portion additionally having a hole adjacent said second end of said opening and substantially equally distant from said first and second sides,* a plurality of first elongated legs joining said substantially flat portion at respective first bent regions that are disposed along said first side of said opening at first predetermined distances from said first end, each first leg being longer than half the distance between said first and second sides, and a plurality of second elongated legs joining said substantially flat portion at respective second bent regions that are disposed along said second side of said opening at second predetermined distances from said first end, said second predetermined distances being different from said first predetermined distances to stagger said second legs with respect to said first legs so that said legs alternate from a first leg to a second leg, for all of said legs, from one of said ends to the other of said ends, each second leg being longer than half the distance between said first and second sides; and screw securing means disposed on said substantially flat portion *at said holes* for securing the mounting screws.

[2. The fixture of claim 1,] *A fixture for mounting an electrical connector element in an opening in a panel, the connector element having a plurality of openings to accommodate mounting screws, comprising:*

*a sheet metal element having*

*a substantially flat portion with an opening therein, said opening having first and second spaced-apart*

*ends and first and second spaced-apart sides that are substantially parallel,*

*a plurality of first elongated legs joining said substantially flat portion at respective first bent regions that are disposed along said first side of said opening at first predetermined distances from said first end, each first leg being longer than half the distance between said first and second sides, and*

*a plurality of second elongated legs joining said substantially flat portion at respective second bent regions that are disposed along said second side of said opening at second predetermined distances from said first end, said second predetermined distances being different from said first predetermined distances to stagger said second legs with respect to said first legs so that said legs alternate from a first leg to a second leg, for all of said legs, from one of said ends to the other of said ends, each second leg being longer than half the distance between said first and second sides; and*

*screw securing means disposed on said substantially flat portion for securing the mounting screws,* wherein said substantially flat portion has at least one screw opening adjacent said first end and at least one screw opening adjacent said second end, and wherein said screw securing means comprises, for each opening, a fastener clip affixed to said substantially flat portion at the respective screw opening.

3. The fixture of claim 1, wherein said screw securing means comprises at least one dimple projecting from said substantially flat portion adjacent said first end and at least one dimple projecting from said substantially flat portion adjacent said second end, *said holes being centrally disposed in* said dimples [having centrally disposed openings therein].

4. The fixture of claim 1, wherein said [substantially flat portion has at least one irregular opening adjacent said first end and at least one irregular opening adjacent said second end,] *holes are irregular in shape,* and wherein said screw securing means comprises, for each irregular [opening,] *hole a* plurality of screw engagement legs provided by the [opening] *hole.*

5. The fixture of claim 4, wherein said irregular [openings] *holes* are generally H-shaped.

6. The fixture of claim 1, wherein said panel is a wall in a building and wherein said connector element is an outlet plate.

7. The fixture of claim 6, wherein said outlet plate is a television outlet plate for conveying a television signal into a room of said building.

8. The fixture of claim 6, wherein said opening in said substantially flat portion is a rectangle providing template means for marking said wall to provide a path for cutting an opening therein.

9. The fixture of claim 6, wherein said sheet metal element is rectangular, wherein said opening in said sheet metal opening is rectangular, and wherein said legs are rectangular.

*10. The fixture of claim 1, wherein said sheet metal element is a unitary element.*

*11. The fixture of claim 1, wherein said panel has a rear surface and a front surface which faces the interior of a room, wherein said substantially flat portion has a front surface which faces away from said panel and a rear surface which faces said front surface of said panel, and wherein said legs pass through said opening in said panel and engage said rear surface of said panel to secure said sheet metal element to said panel.*

*12. The fixture of claim 11, wherein said electrical connector is an outlet plate and wherein said mounting screws secure said outlet plate adjacent said front surface of said substantially flat portion.*

*13. The fixture of claim 12, in combination with said panel, said outlet plate, and said mounting screws.*

*14. A fixture for mounting an electrical connector plate over an aperture in a panel having front and rear surfaces, the connector plate having a plurality of openings to accommodate mounting screws, comprising:*

*a unitary sheet metal element having*

*a substantially flat portion with a substantially rectangular opening therein, said opening having first and second spaced-apart sides that are substantially parallel and third and fourth spaced-apart sides that are substantially parallel, said substantially flat portion having a front surface which faces away from said panel and a rear surface which faces said front surface of said panel, said substantially flat portion additionally having a pair of spaced-apart holes which lie along a line substantially parallel to two of said sides and substantially bisecting said substantially rectangular opening,*

*at least one first elongated leg to pass through said aperture in said panel and engage said rear surface thereof, said at least one first leg extending from said first side of said opening, and*

*at least one second elongated leg to pass through said aperture in said panel and engage said rear surface thereof, said at least one second leg extending from said second side of said opening; and*

*screw securing means disposed on said substantially flat portion at said holes for receiving the mounting screws to attach the electrical connector plate adjacent the front surface of the substantially flat portion.*

*15. The fixture of claim 14, wherein there are a plurality of first elongated legs extending from said first side of said opening at respective first predetermined distances from said third side, wherein there are a plurality of second elongated legs extending from said second side of said opening at respective second predetermined distances from said third side, and wherein said second predetermined distances are different from said first predetermined distances to stagger said second legs with respect to said first legs so that said legs alternate from a first leg to a second leg, for all of said first and second legs, from one of said third and fourth sides to the other of said third and fourth sides.*

*16. The fixture of claim 14, wherein there are a plurality of first elongated legs extending from said first side of said opening, wherein there are a plurality of second elongated legs extending from said second side of said opening, wherein each first leg is longer than half the distance between said first and second sides, and wherein each second leg is longer than half the distance between said first and second sides.*

*17. The fixture of claim 14, wherein one of said holes is adjacent said third side and the other of said holes is adjacent said fourth side, and wherein said screw securing means comprises, for each of said holes, a fastener clip affixed to said substantially flat portion at the respective hole.*

*18. The fixture of claim 14, wherein said screw securing means comprises a dimple projecting from said substantially flat portion adjacent said third side and a dimple projecting from said substantially flat portion adjacent said fourth side, said holes being centrally disposed in said dimples.*

*19. The fixture of claim 14, wherein one of said holes is adjacent said third side and one of said holes is adjacent said fourth side, wherein the holes have irregular shapes, and wherein said screw securing means comprises, for each hole, a plurality of screw engagement legs provided by the hole.*

*20. The fixture of claim 19, wherein said irregular holes are generally H-shaped.*

*21. The fixture of claim 14, wherein said panel comprises a wall in a building.*

*22. The fixture of claim 21, wherein said connector plate is a television outlet plate for conveying a television signal into a room of said building.*

*23. The fixture of claim 21, wherein said opening in said substantially flat portion provides template means for marking said wall to provide a path for cutting an opening therein.*

*24. The fixture of claim 21 wherein said sheet metal element is rectangular, and wherein said legs are rectangular.*

*25. The fixture of claim 14, in combination with said panel, said electrical connector plate, and said mounting screws.*

* * * * *